Patented Feb. 3, 1953

2,627,487

UNITED STATES PATENT OFFICE 2,627,487

INSECT REPELLENTS

Nathan L. Drake, College Heights, Md., Wilbur J. Shenk, Cleveland, Ohio, and Charles M. Eaker, Affton, Mo., assignors to the United States of America as represented by the Secretary of the Army No Drawing. Application January 11, 1949, Serial No. 70,396

6 Claims. (Cl. 167—22)

This invention relates to insect repellents.

We have discovered that the application of a monoamide ester of a dibasic acid whose hydrogen atoms in the carboxyl and amido group are replaced by hydrocarbon residues, when applied to the human skin or a fabric effectively repels insects, particularly Aëdes aegypti and Anopheles quadrimaculatus.

Tests to measure the repellency of the abovementioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

Examples of dibasic amido acids whose hydrocarbon-substituted monoamide esters have insect repellent properties are for instance, succinamic acid, maleamic acid, glutaramic acid, adipamic acid; the substituent hydrocarbon residues on either end of the molecule may for instance be methyl, ethyl, n-propyl, i-propyl, sec-butyl, pentamethylene (on the nitrogen of the amido group), etc.

Thus, the esters contemplated by the present invention have the general formula $$R_2NCO-C_nH_{xn}-COOR'$$

wherein R and R' are hydrocarbon residues not necessarily the same, wherein $n$ is an integer of at least 2, and wherein $x$ is 1 or 2.

The following table illustrates the results obtained by the above test methods against Aëdes aegypti and Anopheles quadrimaculatus, as examples of insects against which the invention is applicable, by using compounds in accordance with the present invention:

a. ESTERS OF N,N-SUBSTITUTED SUCCINAMIC ACID (SUCCINIC ACID MONOAMIDE)

| Material | Repellency on Application to Skin | | Repellency of Impregnated Fabric Against Aëdes aegypti |
|---|---|---|---|
| | Aëdes aegypti | Anopheles quadrimaculatus | |
| | Mins. | Mins. | |
| N,N-diethyl-; ethyl ester | 274 | 46 | over 10 days. |
| N,N-diethyl-; n-propyl ester | 322 | 76 | Do. |
| N,N-diethyl-; i-propyl ester | 255 | 72 | Do. |
| N,N-diethyl-; sec-butyl ester | 377 | 50 | Do. |
| N,N-di-n-propyl-; n-propyl ester | 218 | 37 | |
| N,N-di-n-propyl-; sec-butyl ester | 318 | 41 | over 10 days. |
| N,N-di-i-propyl-; n-propyl ester | 341 | 33 | Do. |
| N,N-di-i-propyl i-propyl ester | 310 | 39 | Do. |
| N,N-di-i-propyl-; sec-butyl ester | 257 | 64 | Do. |
| N,N-pentamethylene-; n-propyl ester | 255 | 72 | At least 1 day. |
| N,N-pentamethylene-; i-propyl ester | 193 | 74 | | b. ESTERS OF N,N-SUBSTITUTED MALEAMIC ACID (MALEIC ACID MONOAMIDE)

| | | | |
|---|---|---|---|
| N,N-diethyl-; ethyl ester | 261 | 51 | Over 10 days. |
| N,N-pentamethylene-; ethyl ester | 268 | 35 | | c. ESTERS OF N,N-SUBSTITUTED GLUTARAMIC ACID (GLUTARIC ACID MONOAMIDE)

| | | | |
|---|---|---|---|
| N,N-diethyl-; methyl ester | 300 | 47 | over 10 days. |
| N,N-di-n-propyl-; methyl ester | 230 | 39 | Do. |
| N,N-di-n-propyl-; ethyl ester | 263 | 40 | Do. |
| N,N-di-i-propyl-; methyl ester | 248 | 39 | Do. |
| N,N-di-i-propyl-; ethyl ester | 289 | 37 | Do. |
| N,N-di-i-propyl-; n-propyl ester | 244 | 36 | Do. | d. ESTERS OF N,N-SUBSTITUTED ADIPAMIC ACID (ADIPIC ACID MONOAMIDE)

| | | | |
|---|---|---|---|
| N,N-diethyl-; ethyl ester | 276 | 50 | Over 10 days. |
| N,N-di-i-propyl-; methyl ester | 343 | 49 | Do. |

The monoamides of dibasic acids whose hydrogen atoms in the carboxyl and amido group are replaced by hydrocarbon residues may be prepared by either of the following two type reactions:

A. Dibasic-acid anhydride + secondary amine ⟶ N,N-di-substituted dibasic acid amide.

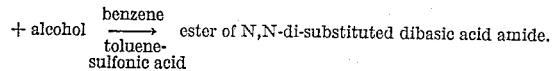

+ alcohol —benzene/toluene-sulfonic acid→ ester of N,N-di-substituted dibasic acid amide.

B. Dibasic-acid anhydride + alcohol ⟶ $\begin{array}{l}CH_2.COOR\\CH_2.COOR\end{array}$ —SOCl₂/CHCl₃→ $\begin{array}{l}CH_2.COOR\\CH_2.COCH\end{array}$ + secondary amine ⟶ ester of N,N-di-substituted dibasic acid amide.

The following examples illustrate the preparation of several typical insect repellent compounds enumerated in the above table:

Example 1

90 gms. of succinic anhydride are placed in 600 cc. of dry benzene and cooled in an ice bath. 98 cc. of diethylamine in 70 cc. of benzene are heated slowly by stirring. Thereafter the reaction mixture is heated under reflux and in a steam bath for about 4 hours. The yield is 153 gms. of N,N-diethyl succinamic acid.

30 gms. of N,N-diethyl succinamic acid obtained by the foregoing reaction are reacted with 25 gms. of ethyl alcohol in the presence of 90 gms. of benzene and 1.29 gms. of toluenesulfonic acid catalyst. Heating and refluxing the reaction mixture near the boiling point of benzene for 6 hours yields 22 gms. of the ethyl ester of N,N-diethyl succinamic acid, a liquid boiling at 106–107° C. at 1 mm. pressure, and whose refractive index is $n_D^{21.5}=1.4509$.

Example 2

55 gms. of diethylamine in 35 gms. of ether are reacted with 54 gms. of succinic acid chloride n-propyl ester in 35 gms. of ether at about 10° C. The reaction mixture is permitted to stand at that temperature for two days. 44 gms. of n-propyl ester of N,N-diethyl succinamic acid are obtained; a liquid having a boiling point of 103–104° C. at .3 mm. pressure.

Example 3

30 gms. of N,N-diethyl succinamic acid are reacted with 25 gms. of isopropyl alcohol in the presence of 90 gms. of benzene and 1.5 gms. toluenesulfonic acid catalyst. 14 gms. of the isopropyl ester of N,N-diethyl succinamic acid are obtained in the form of a liquid having a boiling point of 98–99° C. at .5 mm. pressure, and whose refractive index is $n_D^{21.5}=1.448$.

Example 4

36 gms. of succinic acid chloride n-propyl monoester in 20 gms. of dry ethyl ether are added to 65 gms. of 20% potassium hydroxide, 15 gms. of dry ethyl ether and 21 gms. of di-n-propyl-amine. The reaction mixture is permitted to stand at about 10° C. for about 2 days. 39 gms. of the n-propyl ester of N,N-di-n-propyl succinamic acid are obtained.

Example 5

200 gms. of succinic acid anhydride and 124 gms. of isopropanol are heated in a steam cone for 16 hours. The reaction product is filtered, poured into 2 liters of 10% sodium carbonate solution, washed with ethyl ether, acidified with syrupy phosphoric acid, extracted with ethyl ether, a little benzene added, shaken with magnesium sulfate, and distilled. The resulting intermediate product is the isopropyl monoester of succinic acid, of which 168 gms. are obtained in the form of a solid having a melting point of 49–51° C.; its boiling point is 92–94° C. at .3 mm. pressure.

The above intermediate compound is converted into the succinic acid chloride isopropyl monoester by adding 100 gms. of succinic acid monoisopropyl ester to 150 gms. of purified thionyl chloride in 75 gms. of dry chloroform. The reaction mixture is permitted to stand overnight, then warmed to about 50° C. for about 30 minutes, and the excess thionyl chloride is removed under reduced pressure. 111 gms. of succinic acid chloride isopropyl monoester are obtained.

35 gms. of the succinic acid chloride isopropyl monoester in 25 gms. of ethyl ether are then added to 66 gms. of 20% potassium hydroxide and 25 gms. of piperidine in 20 gms. of ethyl ether at 0° C. with vigorous stirring. The resulting reaction product is the isopropyl ester of N,N-pentamethylene succinamic acid; the yield is 30 gms. of a liquid whose boiling point is 115–116° C. at .4 mm. pressure; refractive index is $n_D^{21.5}=1.4730$.

Example 6

To a cold solution of 44 gms. (.6 mol) diethylamine in 90 ml. absolute ether are added 31 gms. (.22 mol) maleic acid chloride ethyl monoester in 40 gms. absolute ether with cooling and stirring. After all the chloride has been added, the mixture is allowed to stand overnight at room temperature without stirring.

The amine hydrochloride is removed by filtration and the ether solution is washed with 5% phosphoric acid (cold) twice with cold saturated sodium chloride solution. The ether solution is dried over magnesium sulfate. The sulfate is removed by filtration.

The ether is removed by distillation and the ester distils at 115–116° at a pressure of 1 mm.

The yield is 22 gms. of N,N-diethyl maleamic acid ethyl ester, 50% of theory.

It is a water-insoluble liquid; refractive index: $n_D^{20.7}=1.4712$.

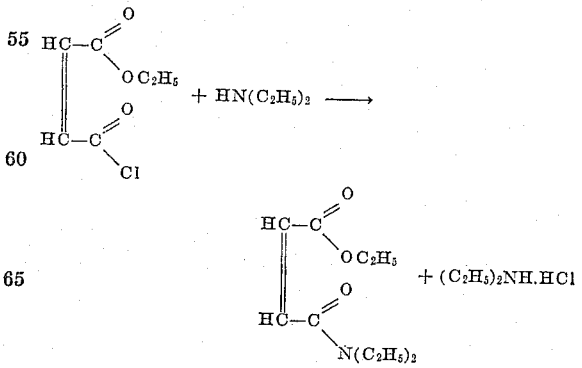

Example 7

To a cold solution of 51 gms. (.6 mol) piperidine in 90 ml. absolute ether are added 31 gms. (.22 mol) maleic acid chloride ethyl monoester in 40 gms. absolute ether with cooling and stirring. This ester is then treated as the one in Example 6.

The ester distils at 137–138° C. at a pressure of 1 mm. The yield was 14 gms. of N,N-pentamethylene maleamic acid ethyl ester; 30.5% of theory.

It is a water-insoluble liquid refractive index: $n_D^{21}=1.4985$.

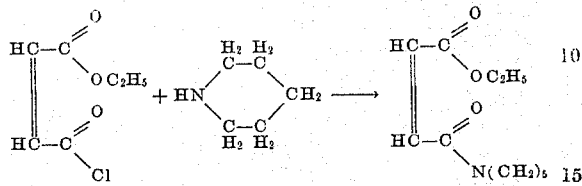

*Example 8*

44 gms. of glutaric acid methyl ester monochloride are reacted with 42 gms. (60 ml.) diethylamine in the presence of 70 ml. of dry ether. The yield is 40 gms. of the methyl ester of N,N-diethyl glutaramic acid, a water soluble liquid whose boiling point is 100–101° C. at .4 mm. pres- whose refractive index is $n_D^{21.9}=1.4560$.

*Example 9*

To 48 gms. of 25% potassium hydroxide and 22.2 gms. of di-isopropylamine are added 36 gms. of adipic acid chloride methyl monester in 30 ml. of ether at 0° C. After all the monoester has been added, the solution is stirred for 30 minutes, additional ether is added, and the formed aqueous layer is separated. The ether layer is then washed with 5% cooled phosphoric acid solution, and the excess acid solution is removed by washing with cold salt solution. The ether is then dried, and the solution filtered. Finally, the ether is removed by distillation, and the ester remains, which distills at 110–111° C. at .5 mm. pressure. The yield is 29 gms. of the methyl ester of N,N-di-isopropyl adipamic acid, a water-white liquid whose refractive index is $n_D^{21.9}=1.4560$.

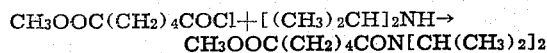

For ease of application the compounds contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus fully described our invention,

We claim:

1. An insect repellent composition comprising a member of the group consisting of the propyl ester of N,N-diethyl succinamic acid and the propyl ester of N,N-pentamethylene-succinamic acid, and a non-toxic insect-repellent-adjuvant as a carrier therefor.

2. An insect repellent composition comprising the propyl ester of N,N-diethyl succinamic acid and a non-toxic insect-repellent-adjuvant as a carrier therefor.

3. An insect repellent composition comprising the n-propyl ester of N,N-diethyl succinamic acid and a non-toxic insect-repellent-adjuvant as a carrier therefor.

4. An insect repellent composition comprising the propyl ester of N,N-pentamethylene succinamic acid, and a non-toxic insect-repellent-adjuvant as a carrier therefor.

5. The process of preparing an N,N-hydrocarbon-substituted dibasic acid monoamide alkyl ester, comprising reacting a member of the group consisting of dibasic acids and dibasic acid anhydrides with an N,N-hydrocarbon-substituted secondary amine, and reacting the reaction product with a monohydric alcohol.

6. The process of preparing an N,N-hydrocarbon-substituted dibasic acid monoamide alkyl ester, comprising reacting a member of the group consisting of dibasic acids and dibasic acid anhydrides with an N,N-hydrocarbon-substituted secondary amine, and reacting the reaction product with a monohydric alcohol in the presence of benzene and toluene sulfonic acid as a catalyst.

NATHAN L. DRAKE.
WILBUR J. SHENK.
CHARLES M. EAKER.

REFERENCES CITED

The following references are of record in the file of this patent:

UNITED STATES PATENTS

| Number | Name | Date |
|---|---|---|
| 2,306,095 | Valjavec | Dec. 22, 1942 |
| 2,313,573 | Orthner | Mar. 9, 1943 |
| 2,400,006 | Jones et al. | May 7, 1946 |
| 2,502,478 | Padbury | Apr. 4, 1950 |

OTHER REFERENCES

OSRD, Bimonthly Progress Report Number 21, Sec. 1, December 31, 1944. Page 10, Orlando Number 0-6166 Ethyl N,N-diethyl-succinamate.

OSRD, Bimonthly Progress Report Number 24, Sec. 1, June 30, 1945. Pages 2, 3, Orlando Nos. 0-6484, 0-6511; resp. adipamic acid, N,N-diisoproply-, methyl ester, and adipamic acid, N,N-diethyl-, ethyl ester.

OSRD, Bimonthly Progress Report No. 25, Sec. 1, August 31, 1945. Page 12, Orlando No. 0-6484.

Linduska et al., Flea Repellents, volume 41, 1947, Chemical Abstracts, page 3580.